Patented Oct. 13, 1925.

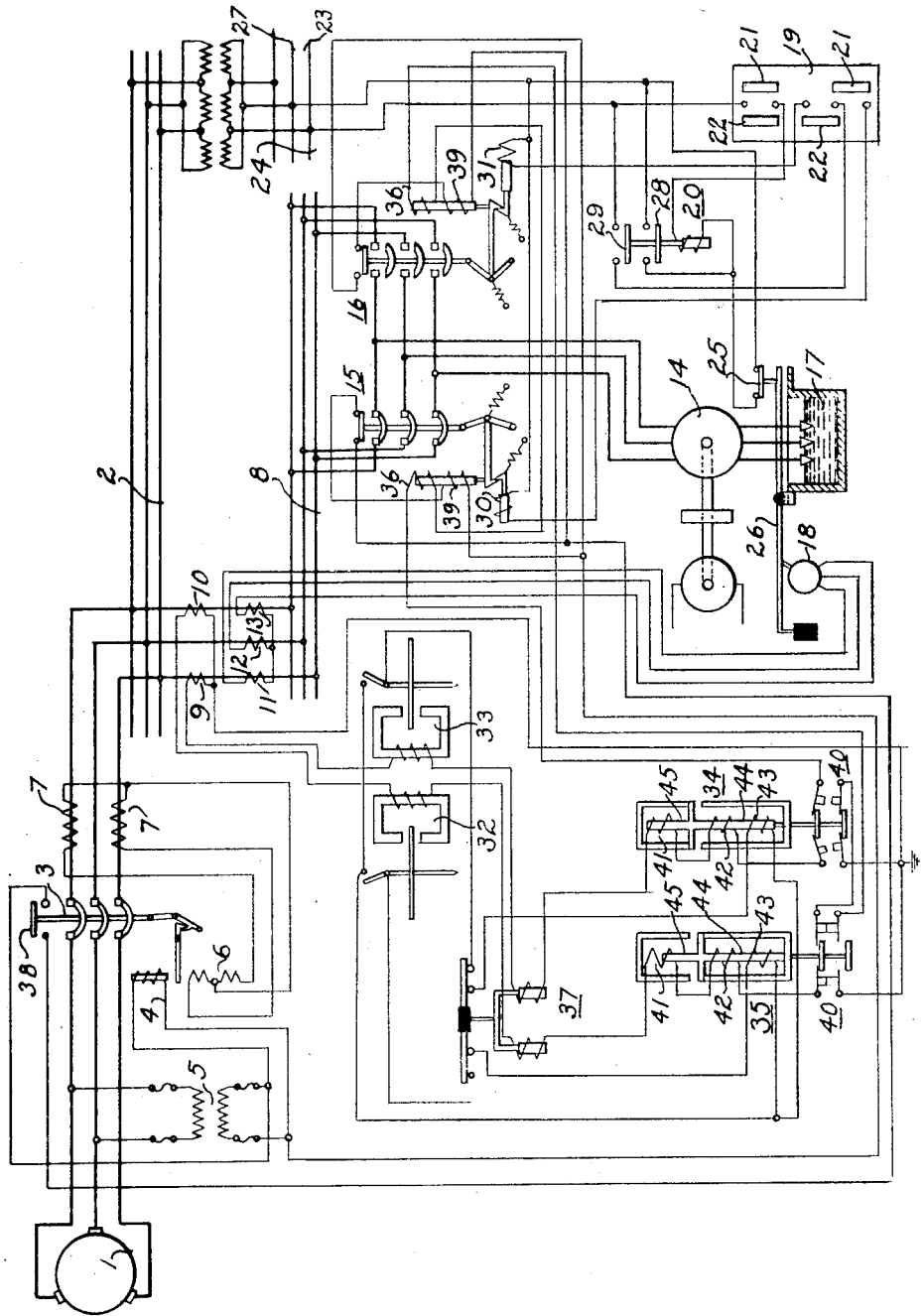

1,557,128

UNITED STATES PATENT OFFICE.

GOLDER P. WILSON, OF WILKINSBURG, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTING SYSTEM.

Application filed January 31, 1921. Serial No. 441,174.

*To all whom it may concern:*

Be it known that I, GOLDER P. WILSON, a citizen of the United States, and a resident of Wilkinsburg, in the county of Allegheny and State of Pennsylvania, have invented a new and useful Improvement in Circuit-Interrupting Systems, of which the following is a specification.

My invention relates to circuit interrupting systems and particularly to systems employed for the protection of rolling-mill motors.

One object of my invention is to provide a circuit interrupting system for rolling-mill motors that shall not require an external source of control energy to operate the apparatus.

Another object of my invention is to provide a rolling-mill-motor-control system embodying a main or group interrupter having a large rupturing capacity and two feeder-circuit interrupters having small rupturing capacity and employed to control the forward and the reverse direction of rotation of the motor, and protective apparatus therefor that shall permit the main interrupter to open first upon the occurrence of a heavy overload or short circuit, whereupon the feeder-circuit interrupters shall be actuated by energy derived from the main circuit.

Another object of my invention is to provide, in a system of the above-indicated character, two interrupters for controlling the forward and the reverse direction of rotation of the motor, a slip regulator and means for selectively actuating the interrupters that shall be operated to actuate the same only when the regulator is in a predetermined position.

Another object of my invention is to provide a control system of the above indicated character that shall obviate the necessity for additional sources of control energy, such as storage batteries, and that shall be simple and reliable in its operation.

Heretofore, an auxiliary supply of control energy has been required for the operation and protection of rolling-mill systems. The attention required for storage batteries, in view of the infrequent use thereof for the protection of rolling-mill systems, has developed considerable objections thereto.

In developing my system, it has been my purpose to eliminate the necessity for external sources of control energy and to provide a system in which the operating and control energy might be derived from the system itself. The main elements of the system disclosed, comprise a main or group interrupter connecting a source of energy to a bus circuit; a rolling-mill motor connected to the bus circuit through two circuit interrupters to control the forward and the reverse direction of rotation of the motor, and a slip regulator to control the motor in accordance with the load thereon.

The control apparatus comprises control switches for effecting the actuation of either one of the motor interrupters, the switches being interlocked with the slip regulator to prevent the starting of the motor until the regulator is in a predetermined starting position.

The protective apparatus is energized in accordance with the current traversing the motor circuit and, although permitting the motor circuit to be interrupted by the motor interrupters upon the occurrence of a normal overload, the protective apparatus precludes the motor interrupters from opening the circuit upon the occurrence of a short circuit or an abnormal overload. Upon the occurrence of such conditions, the main or group interrupter is permitted to open, whereupon a circuit is completed to energize the tripping devices of the motor interrupters to open the same.

The single figure of the accompanying drawing is a diagrammatic view of an electrical system embodying my invention.

A source 1 of electromotive force is connected to a bus circuit 2 by means of a main or group circuit interrupter 3. The interrupter is provided with a low-voltage coil 4 that is energized from a potential transformer 5 and serves to open the interrupter when the voltage on the circuit decreases below a predetermined value. The interrupter is further provided with a plurality of trip coils 6 that are energized from a plurality of current transformers 7 in accordance with the current traversing the circuit.

The bus circuit 2 is connected to a motor bus circuit 8 through two sets of current transformers 9 and 10, and 11, and 12, and 13. The motor bus circuit 8 provides energy to a motor 14, of a flywheel motor-generator set, through two circuit interrupters 15 and 16 that are so connected between the bus circuit 8 and the motor 14 as to control the forward and the reverse direction of rotation thereof. The operation of the motor 14 is further controlled by a slip regulator 17, the adjusting torque motor 18 of which is energized from the current transformers 11, 12 and 13.

The actuation of the interrupters 15 and 16 is controlled by a manually operated switch 19 and a relay switch 20. To close the interrupter 15, the switch 19 is moved to the left to cause the bridging members 21 to engage the corresponding contact members, whereupon a circuit is completed from the conductor 23 of an auxiliary control bus 24 through an auxiliary switch 25 on the arm 26 of the slip regulator and the operating coil of the relay switch 20 to the bus conductor 27. The switch 20 is thereupon actuated to complete a holding circuit through a switch 28 and to complete a closing circuit through a switch 29, the lower contact members of the switch 19 and the closing coil 30 of the interrupter 15, whereupon the interrupter is closed.

The mass and inertia of the flywheel motor-generator unit are relatively so large that sufficient energy may be stored in the unit to cause it to rotate for a relatively long time if it is permitted to rotate unimpeded and without load on the generator. When the use of the unit is no longer desired, it is preferable to stop the unit rather than to permit it to continue to rotate idly. The unit is stopped by electric braking by so reversing the connections to the motor that it tends to reverse. The unit may thus be stopped in a few minutes.

When it is desired to stop the motor 14, the switch 19 is actuated to move the bridging members 21 and 22 toward the right, whereupon the circuit for energizing the relay switch 20 is again completed upon the return of the arm 26 of the slip regulator to such position that maximum resistance is inserted between the electrodes. The closing of the switch 29, upon the operation of the relay 20, completes a circuit through the switch 19 and the closing coil 31 of the interrupter 16 to close that interrupter.

The control switch 19 is adapted to remain in such position to which it may be actuated and, upon the removal thereof from one position to the other to reverse the direction of rotation of the motor, the interrupter that was formerly closed is permitted to be opened by reason of the de-energization of its closing or holding coil.

The protection of the motor is effected by the co-operation of a plurality of relays that are energized from the current transformers 9 and 10. Two overload relays 32 and 33 are employed to control the operation of two direct trip relays 34 and 35, respectively, that control the energization of the trip coils 36 of the interrupters 15 and 16. In order to prevent the actuation of the interrupters 15 and 16, upon the occurrence of a heavy overload or short circuit because of the low rupturing capacity of those interrupters, an instantaneous-operating relay 37, adjusted for a predetermined value of current, is employed to prevent the operation of the relays 34 and 35 upon the occurrence of an abnormal overload or short circuit.

Upon the occurrence of such conditions, the current transformer 7 becomes sufficiently energized to trip the interrupter 3, whereupon an auxiliary switch 38 is closed by the interrupter to complete a circuit from the potential transformer 5 to energize the trip coils 39 of the interrupters 15 and 16. Since the interrupter 3 is opened before the potential is impressed upon the trip coils 39, there will be potential of normal value on the circuit 1 and, therefore, on the potential transformer 5.

As described above, the closing of the interrupters 15 and 16 is precluded until the slip regulator is in a predetermined position at which the resistance between the several electrodes is at its maximum value. Upon the occurrence of an overload of less than a predetermined abnormal value, the current transformers 9 and 10 sufficiently energize the relays 32 and 33 to effect the actuation of one or both of the relays 34 and 35 to complete an energizing circuit for the trip coils 36.

The relays 34 and 35 comprise a switching device 40, two windings 41 and 42 correspondingly wound and a winding 43 disposed adjacent the winding 42 and wound in an opposite direction with respect thereto. When the winding 43 is close-circuited, the effect of the winding 42 upon its core member 44 is neutralized and the core member 44 is actuated upwardly by the attraction of the core member 45 which is energized by the winding 41. The upward movement of the core member 44 actuates the switching device.

The relay 34 is shown in its operative position and the relay 35 is shown in its normal position.

Upon the occurrence of a short circuit or heavy overload exceeding a predetermined value, the relay 37 operates to open the circuits, whereby the relays 32 and 33 might close-circuit the windings 43 of the relays 34 and 35, thus preventing the operation of the relays 34 and 35 to actuate the interrupters 15 and 16. The consequent traversal of the circuit by a current of abnormal value energizes the current transformers 7 to actuate the interrupter 3, whereupon the interrupter 15 or 16 is consequently opened.

It will thus be observed that, in the above system, an operation and control energy is derived directly from the system and that no external or auxiliary sources of control energy are required.

My invention is not limited to the specific arrangement of the apparatus that is illustrated, since modifications may be made therein within the spirit and scope of my invention, as set forth in the appended claims.

I claim as my invention:—

1. In a rolling-mill-motor-control system, the combination with a motor a main or group interrupter having a large rupturing capacity and a plurality of feeder interrupters having a small rupturing capacity for controlling the energy supply to the motor, of means for preventing the actuation of the feeder interrupters upon the occurrence of a short circuit or sudden overload exceeding a predetermined value, means for actuating the main interrupter under such conditions, means controlled upon the actuation of the main interrupter for tripping the feeder interrupters, and means dependent upon a predetermined condition of the motor for controlling the operation of the interrupters.

2. In a rolling-mill-motor-control system, the combination with a main or group interrupter having a large rupturing capacity and a plurality of feeder interrupters having a small rupturing capacity for a rolling-mill motor, the interrupters being connected in the circuit to cause reversed rotation of the motor, of selective means for closing one interrupter, co-operative means associated with the group interrupter and with the closed feeder interrupter for effecting the actuation of the feeder interrupter only after the group interrupter has been opened, and means dependent upon a predetermined condition of the motor for controlling the effectiveness of the selective means.

3. In a rolling-mill-motor-control system, the combination with a main or group interrupter having a large rupturing capacity and a plurality of feeder interrupters having a small rupturing capacity for a rolling-mill motor, the plurality of interrupters being connected in the circuit to cause reversed rotation of the motor, of selective means for closing one interrupter, a source of control energy derived from the main circuit and means associated with the group interrupter and with the closed feeder interrupter for effecting the tripping of the feeder interrupter by means of the derived control energy when the group interrupter is opened by reason of a short circuit on the feeder circuit.

4. In an electrical system, the combination with a group interrupter for the main circuit and two feeder circuit interrupters for controlling the direction of rotation of a rolling-mill motor and a slip regulator for the motor, of selective means for closing one of the feeder interrupters, means controlled by the regulator for controlling the selective means and means whereby the closed feeder interrupter may be actuated by energy from the main circuit after the group interrupter has been opened by reason of a fault on the feeder circuit.

5. In an electrical system, the combination with a group interrupter for the main circuit and two feeder circuit interrupters for controlling the direction of rotation of a rolling-mill motor and a slip regulator for the motor, of selective means for closing one of the feeder interrupters, means rendered operative when the regulator is in a predetermined position for controlling the selective interrupter-closing means and means for actuating the closed feeder interrupter, by energy derived from the main circuit, only after the group interrupter has been actuated.

6. In an electrical system, the combination with a group interrupter for the main circuit and two feeder circuit interrupters for controlling the direction of a rolling-mill motor and a slip regulator for the motor, of selective means for closing one of the feeder interrupters, and means controlled by the slip regulator for rendering the selective closing means inoperative until the regulators have been actuated to a predetermined position.

7. In an electrical system for a rolling-mill motor, the combination with a main or group interrupter for the main circuit and two feeder circuit interrupters for controlling the direction of rotation of a rolling-mill motor, of means for precluding the actuation of either of the feeder interrupters if current traverses the same in excess of a predetermined value, means for actuating the main interrupter under such conditions and means controlled by the main interrupter for actuating the closed feeder interrupter by energy derived from the main circuit.

8. In an electrical system for a rolling-mill motor, the combination with two circuit interrupters for controlling the reversing of a mill motor and a slip regulator for the motor, of means for selectively actuating one interrupter and means controlled according to the position of the regulator for controlling the interrupter-actuating means.

9. In a controller for induction motors, in combination, means for establishing reverse power connections for the motor, a fluid rheostat for controlling the secondary circuit of the motor and means insuring against reversal of the power connections by said former means for plugging of the motor except upon a given immersion of the electrodes of said rheostat.

10. In a controller for induction motors, in combination, means for establishing reverse power connections for the motor, a fluid rheostat for controlling the secondary circuit of the motor and means for increasing the immersed area of the electrodes of said rheostat for starting of the motor and for insuring quick reduction of such area to a given value prior to reversal of the power connections by said former means for plugging of the motor.

11. In a controller for induction motors, in combination, means for establishing reverse power connections for the motor, a fluid rheostat for controlling the secondary of the motor, said rheostat including means for increasing the immersed area of the electrodes thereof for starting of the motor and means for effecting a relatively quick reduction in the immersed area of the electrodes prior to plugging of the motor, and means for insuring against reversal of the power connections by said first-mentioned means except upon a given reduction in the immersed area of said electrodes.

12. In a controller for induction motors, in combination, means for establishing reverse power connections for the motor, a fluid rheostat for controlling the secondary circuit of the motor, said rheostat including means for increasing the immersed area of the electrodes thereof for starting of the motor and means for effecting a relatively quick reduction in the immersed area of the electrodes upon interruption of the power connections and means for insuring against reversal of the power connections by said first-mentioned means except upon a given reduction in the immersed area of said electrodes.

13. In a controller for induction motors, in combination, a pair of reversing switches operable selectively to establish reverse power connections for the motor, a fluid rheostat for controlling the secondary circuit of the motor, said rheostat including means for effecting a quick reduction in the immersed area of the electrodes thereof upon opening of either of said reversing switches, and means associated with said reversing switches for insuring against reversal of the power connections for plugging of the motor except upon a given reduction in the immersed area of the electrodes of said rheostat.

14. In a controller for induction motors, in combination, a pair of reversing switches for establishing reverse power connections for the motor, a fluid rheostat connected in the secondary circuit of said motors, means for operating said reversing switches selectively and for effecting a quick reduction of the immersed area of the electrodes of said rheostat upon opening of said reversing switches, and an electro-responsive device controlled by said rheostat for insuring against closure of said reversing switches except upon reduction of the immersed area of the electrodes of said rheostat to a given value.

In testimony whereof, I have hereunto subscribed my name this 29th day of January 1921.

GOLDER P. WILSON.